(12) United States Patent
Peterson et al.

(10) Patent No.: US 8,370,942 B1
(45) Date of Patent: Feb. 5, 2013

(54) PROACTIVELY ANALYZING BINARY FILES FROM SUSPICIOUS SOURCES

(75) Inventors: Christopher Peterson, Culver City, CA (US); Robert Conrad, Culver City, CA (US); Joseph H. Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 559 days.

(21) Appl. No.: 12/403,321

(22) Filed: Mar. 12, 2009

(51) Int. Cl.
*H04L 29/06* (2006.01)
(52) U.S. Cl. .............................. 726/24; 726/22; 726/23
(58) Field of Classification Search .................. None
See application file for complete search history.

(56) References Cited

U.S. PATENT DOCUMENTS

| | | | | |
|---|---|---|---|---|
| 2004/0073810 | A1* | 4/2004 | Dettinger et al. | 713/201 |
| 2006/0161984 | A1* | 7/2006 | Phillips et al. | 726/24 |
| 2007/0143848 | A1* | 6/2007 | Kraemer et al. | 726/23 |
| 2008/0256636 | A1* | 10/2008 | Gassoway | 726/24 |
| 2009/0019547 | A1* | 1/2009 | Palliyil et al. | 726/25 |
| 2010/0077481 | A1* | 3/2010 | Polyakov et al. | 726/24 |

* cited by examiner

*Primary Examiner* — Jung Kim
*Assistant Examiner* — Adrian Stoica
(74) *Attorney, Agent, or Firm* — Brill Law Office; Jeffrey Brill

(57) ABSTRACT

A malware source analysis component determines which sources of malware are sufficiently suspicious such that all binary files located thereon should be analyzed. In order to makes such determinations, the malware source analysis component receives information concerning malware infections from a plurality of sources. The malware source analysis component analyzes the received information, and determines suspiciousness levels associated with specific sources. Responsive to identifying a given threshold suspiciousness level associated with a source, the malware source analysis component adjudicates that source to be suspicious. Where a source is adjudicated to be suspicious, the malware source analysis component submits submission instructions to that source, directing it to identify binary files thereon and submit them to be analyzed. The malware source analysis component receives binary files from suspicious sources according to the submission instructions, and analyzes the received binary files.

21 Claims, 2 Drawing Sheets

PROACTIVELY ANALYZING BINARY FILES FROM SUSPICIOUS SOURCES

TECHNICAL FIELD

This invention pertains generally to computer security, and more specifically to proactively analyzing binary files from suspicious sources.

BACKGROUND

Malware, such as computer viruses, worms and Trojan horses, is a serious threat to both business and personal computing. Various software vendors provide anti-malware products, which can detect, block and/or remove malware on a user's computer. Anti-malware products use various techniques to protect users from malware, such as, but not limited to, intrusion prevention, web browser defense, signature based detection, heuristic based detection and behavior based detection. When an anti-malware product detects a specific instantiation of malware, the anti-malware product can make a copy of the detected malware and analyze it, to learn more about both how it works and how to identify and disarm similar threats in the future. Additionally, users sometimes proactively submit suspect files to anti-malware vendors (e.g., over the Internet) to have them checked for malware.

Some binary files present on some computers comprise malware that cannot be detected by an anti-malware product. This can be the case, for example, where the specific instantiation of the malware, or the manner in which the malware is encoded in the binary file, is not yet known to the computer security industry. It would be desirable to further analyze such binary files, in order to detect, learn more about and protect users against new malware. However, analyzing all binary files that an anti malware product does not detect as comprising malware is simply not practicable. Some commercial anti-malware products have very large foot prints in the security market. These products can be installed on so many computers that limited hardware resources prevent the analysis of all binary files located thereon. In any case, most binary files located on most such computers do not comprise malware. However, by not analyzing binary files that an anti-malware product does not detect as comprising malware, important new malware could be overlooked. It would be desirable to address these issues.

SUMMARY

A malware source analysis component determines which sources of malware are sufficiently suspicious such that all binary files located thereon should be analyzed. In order to makes such determinations, the malware source analysis component receives information concerning malware infections from a plurality of sources. The malware source analysis component analyzes the received information, and determines suspiciousness levels associated with specific sources. Responsive to identifying a given threshold suspiciousness level associated with a source, the malware source analysis component adjudicates that source to be suspicious. Where a source is adjudicated to be suspicious, the malware source analysis component submits submission instructions to that source, directing it to identify binary files thereon and submit them to be analyzed. The malware source analysis component receives binary files from suspicious sources according to the submission instructions, and analyzes the received binary files.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
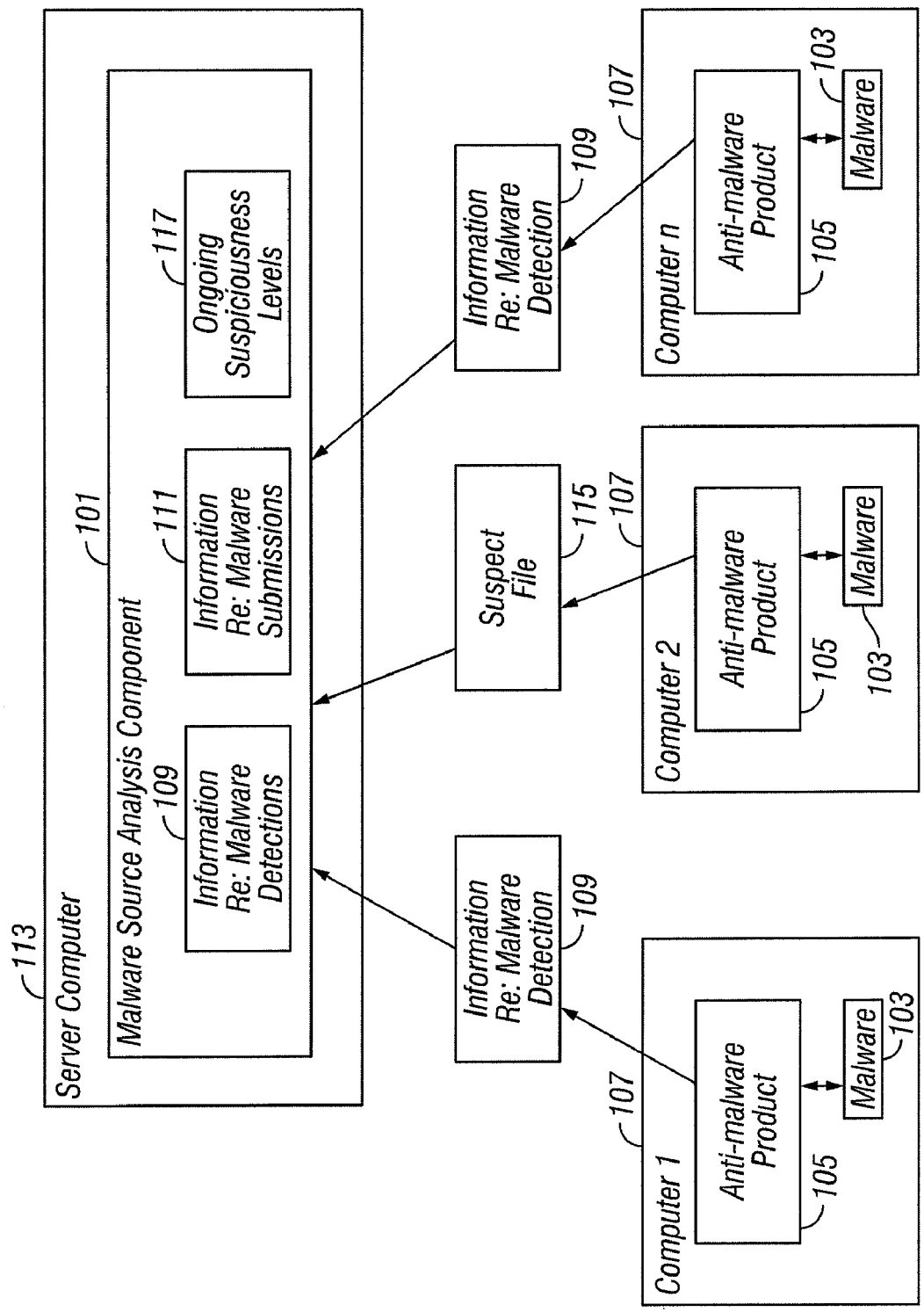
FIG. 1 is a block diagram illustrating a system for identifying suspicious sources of malware, according to some embodiments of the present invention.

FIG. 1 illustrates a malware source analysis component 101 identifying suspicious sources of malware 103, according to some embodiments of the present invention. It is to be understood that although the malware source analysis component 101 is illustrated in FIG. 1 as a separate entity, the malware source analysis component 101 represents a collection of functionalities which can be implemented as software, hardware, firmware or any combination of these. Where the malware source analysis component 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, an anti-malware product 105 is installed on the computers 107 of multiple users, and checks for and detects malware 103 thereon. The anti-malware product 105 can be instantiated in any known form or combinations of forms, such as, but not limited to an intrusion prevention system, a web browser defense system and/or a signature, heuristic and/or behavior based detection system. A user computer 107 can comprise any computing device operated by a user in a business or personal context (e.g., a client computer). In FIG. 1, the anti-malware product 105 is illustrated as being installed on the user computers 107 themselves, but it is to be understood that an anti-malware product 105 and/or components thereof can also be installed on a server, a proxy or other computing devices depending upon the specific installation scenario. Also, only three user computers 107 running the anti-malware product 105 are shown for the sake of illustration, but in practice typically many orders of magnitude more would be deployed.

When the anti-malware product 105 detects malware 103 installed on a user's computer 107, the anti-malware product 105 sends information 109 concerning the detection of the malware 103 to a malware source analysis component 101 for subsequent analysis. The malware source analysis component 101 is located at a central location, for example a server computer 113 as illustrated. The information 109 that is sent to the malware source analysis component 101 concerning the malware 103 detection can, but need not, include an actual copy of the malware 103 itself. An identification of the infected computer 107 and the date and time the infection was detected are also typically included in the information 109 (or determined by the malware source analysis component 101).

Additionally, users that suspect a given file 115 is infected with or comprises malware 103 submit suspect files 115 to the malware source analysis component 101 to be checked for malware 103. Upon receipt, the malware source analysis component 101 can note information 111 concerning the submission, such as the date, time, source and content. When the malware source analysis component 101 determines that a given submitted suspect file 115 is infected with or comprises malware 103, the malware source analysis component 101 can analyze that detected malware 103, as well as the corresponding submission information 111.

By receiving submissions and making detections of malware 103 from a wide variety of user's computers 107, the malware source analysis component 101 has access to a wide array of information 109/111 concerning malware 103 infections as they occur in the field. As illustrated in FIG. 1, this information 109/111 is leveraged to identify suspicious sources of malware 103 (e.g., individuals or organizations likely to be writing and distributing malware 103, computers 107 from which such distribution is likely to be occurring, individuals or organizations likely to be particularly prone to malware 103 infection, etc.). As explained in more detail below, specific patterns of detection or submission of malware 103, as well as other specific factors, are interpreted to indicate that the infected/submitting party is suspicious.

The malware source analysis component 101 analyzes information 109/111 concerning detected and submitted malware 103, and identifies suspicious activity. One activity that is considered suspicious is the suspected origination of malware 103. Some malicious parties write and test new malware 103, and this clearly constitutes suspicious activity. Upon receiving information 109/111 concerning detection or submission of malware 103, the malware source analysis component 101 can determine whether this particular malware 103 is already known. Because the malware source analysis component 101 receives information 109/111 concerning a wide variety of malware 103 from the numerous computers 107 running the anti-malware product 103, the malware source analysis component 101 often has already analyzed a particular piece of submitted/detected malware 103, and thus is able to detect that the malware 103 is already known. Additionally (or instead), the malware source analysis component 101 can refer to one or more proprietary and/or public databases of known malware 103 to determine whether a specific piece of submitted/detected malware 103 is new. Where the particular malware 103 is not being seen for the first time, these techniques can also be used to determine for how long the malware 103 has been in circulation, based on the dates/times of first known occurrence recorded by the malware source analysis component 101 and/or in the database(s).

Initial detection or submission of a new piece of malware 103 is an indication that the source might be an author of new malware 103, testing the new malware 103 against the anti-malware product 103 to see if it can be detected. Where the malware 103 has already been seen, the later it is in the life cycle of that malware 103, the less likely it is that the malware 101 is coming from its originator. In other words, even if the particular malware 103 has been seen once or twice before within a very recent time frame (e.g., minutes, hours or even days), it is possible that the originator of the malware 103 is still testing it for possible detectability. However, if a detected infection involves malware 103 that is well known and has been in circulation for months, it is not likely that the detection is associated with the originator of that malware 103.

How suspicious specific characteristics and actions are considered to be is a variable design parameter. For example, in one embodiment, proactively submitting a new piece of malware 103 is considered more suspicious than having one detected by the routine action of the anti-malware product 103, although in another embodiments no distinction is made between these events. The length of time in which a particular piece of malware 103 need be in circulation before its submission/detection is no longer considered suspicious can be adjusted up and down in different embodiments, and based on other factors such as the type of malware (e.g., virus versus worm), the potential threat level of the malware 103, etc. A single instance of a user submitting a new piece of malware 103 is typically considered only somewhat suspicious, but if the same user continues to submit multiple pieces of new malware 103 over time, that would likely be considered very suspicious.

Another factor that the malware source analysis component 101 can interpret as an indication that an originator is testing a piece of malware 103 is multiple submissions/detections of separate instances of malware 103 with different hash values, each instance having a single malicious signature. In other words, where variations of a single piece of malware 103 are being submitted/detected by/on a single source, it is an indication that the source comprises an originator who is tweaking malware 103 to evade detection. Variations on a single piece of malware 103 can be identified where the corresponding hash values vary between submissions/detections, but the underlying signature identifying the malware 103 is the same for each submissions/detection. An example of this would be the case in which multiple submissions/detections have different MD5 hash values, MD5 being a cryptographic hash function often used by anti-malware products 103, but the same underlying malware 103 signature. (A cryptographic hash function is a deterministic procedure that takes a block of data and returns a fixed-size bit string, the hash value, such that an accidental or intentional change to the data will almost certainly change the hash value.) Note that polymorphic viruses work by frequently changing their image to prevent detection of their malicious payload, so the above described identification of varying hash values and a constant signature does not indicate a likelihood of an originator of malware 103 in the case of known or identified polymorphic malware 103.

In its identification of factors indicating that a party is suspicious, the malware source analysis component 101 can associate each detection and submission source (e.g., user computer 107, specific user of a given computer 107, a specific user of multiple computers 107, etc.) with an identifier, such as a global unique identifier (GUID). For each submission or detection of malware 103, the malware source analysis component 101 can determine a suspiciousness level, based on factors such as those described above. The malware source analysis component 101 also maintains an ongoing suspiciousness level 117 for each detection/submission source (identified, for example, by GUID), based on the history of detections/submissions from that source. What suspiciousness level to assign based on various given suspicious detections/submissions is a variable design parameter, as is ongoing suspiciousness level 117 calculation based on multiple suspicious events. When the ongoing suspiciousness level 117 for a detection/submission source reaches a given threshold, the malware source analysis component 101 adjudicates the given detection/submission source as being suspicious. What threshold to use in making such determinations is another variable design parameter, which can vary between embodiments as desired.

Other factors can also be used by the malware source analysis component 101 to calculate the ongoing suspiciousness level 117 for each source from which malware 103 is received. For example, it is known that disproportionate amount of malware 103 originates from certain countries (e.g., China, Lithuania, etc.). Therefore, in some embodiments, the malware source analysis component 101 increases the ongoing suspiciousness levels 117 by a given amount for sources located in a suspect country. Ongoing suspiciousness levels 117 can also be lowered based on a source being located in a more trusted country. The specific amount to adjust ongoing suspiciousness levels 117 based on sources being located in specific countries is a variable design parameter. The malware source analysis component 101 can determine in which country a source is located, for example, from the country code in the uniform resource locator (URL), which can be included in the received content or determined by the malware source analysis component 101 from the transmission thereof.

Other factors can also be used to adjust the ongoing suspiciousness levels 117. In one embodiment, instances of the anti-malware product 105 running on user computers 107 can monitor the behavior of the associated users, and rate how safe their network based activity is over time. For example, if a user always runs from behind a reputable firewall, scans his computer 107 for malware on a regular basis and never downloads files from unknown websites, the anti-malware product 105 could rate that user as being generally secure. On the other hand, a user that does not take such precautions would receive a lower security rating. The anti-malware product 105 could transmit the security rating for a given user as part of the information 109/111, and the security rating could then be taken into account by the malware source analysis component 101 in determining the associated ongoing suspiciousness level 117.

In some embodiments, the malware source analysis component 101 determines ongoing suspiciousness levels 117 on a group basis (e.g., all user computers 107 at a given domain, enterprise, etc.) in addition to or instead of on an individual basis.

Figure 2:
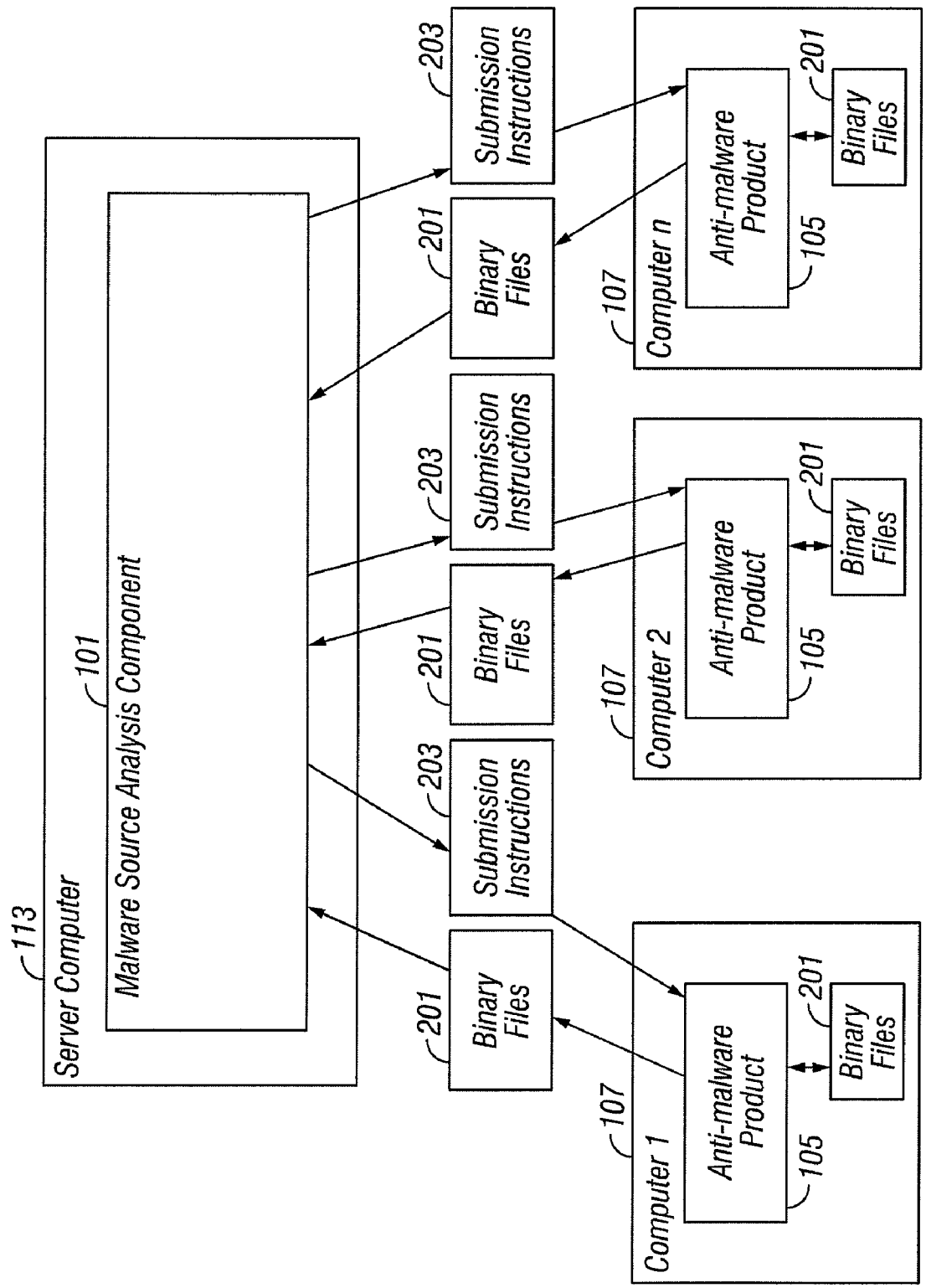
FIG. 2 is a block diagram illustrating an anti-malware product running on specific user computers proactively submitting all identified binary files for analysis, according to some embodiments of the present invention.

As illustrated in FIG. 2, once the malware source analysis component 101 adjudicates that a given source is suspicious, the malware source analysis component 101 subjects that source to proactive submission of all binary files 201. More specifically, where a given source has a sufficiently high ongoing suspiciousness level 117, it is desirable for the anti-malware product 105 to proactively identify and submit all binary files 201 thereon, even where the anti-malware product 105 does not specifically identify these files 201 as comprising malware 103. In other words, where a given source is found to have such a requisite ongoing suspiciousness level 117, the malware source analysis component 101 determines that any binary file 201 on that source is likely enough to comprise malware 103 that it should be analyzed.

As illustrated in FIG. 4, the malware source analysis component 101 transmits corresponding submission instructions 203 to instances of the anti-malware product 105 running on individual user computers 107 that are to proactively identify and submit binary files 201. The instances of the anti-malware product 105 that receive such submission instructions 203 not only submit detected malware 103, but also track all binary files 201 on the corresponding user computers 107, and submit those binary files 201 as well. When an instance of the anti-malware product 105 first receives such submission instructions 203, it identifies all binary files 201 on the user computer that have not been specifically detected as comprising malware 103, and submits those binary files 201 for analysis. From that point forward, the instance of the anti-malware product 105 tracks which binary files 201 it has submitted (e.g., by tracking identifying information such as date/time of last modification, hash of content, etc.). When new binary files 201 are copied to or created on the user computer 107, or existing ones are modified, the instance of the anti-malware product 105 detects this, and submits the new/modified binary files 201 for analysis.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. As used herein, the terms "computer," "client," "client computer," "server," "server computer" and "computing device" mean one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for proactively analyzing binary files from suspicious sources, the method comprising the steps of:

receiving information concerning malware infections from a plurality of sources, by a computer;

analyzing the information concerning the malware infections received in the past from the plurality of sources to determine suspiciousness levels associated with specific ones of the plurality of sources, the suspiciousness levels at least in response to detection of malware on the specific ones of the plurality of sources, by a computer to which the detected malware is previously unknown;
responsive to a given suspiciousness level associated with at least one source from the plurality of sources reaching a given threshold, transmitting, by a computer, submission instructions directing the at least one source to submit all current binary files to be analyzed, at least a portion of the binary files comprising binary files not associated with detected malware infections;
receiving binary files from the at least one source according to the submission instructions, by a computer; and
analyzing the binary files not associated with detected malware infections received from the at least one source, to protect the plurality of sources from new malware originating from the at least one source, by a computer.

2. The method of claim 1 wherein receiving information concerning malware infections from a plurality of sources further comprises performing at least one step from a group of steps consisting of:
receiving information concerning at least one detection of malware on at least one source, by a computer;
receiving information concerning at least one detection of malware on at least one source, and determining additional information concerning the at least one detection from the receipt, by a computer;
receiving at least one submission of suspected malware from at least one source, by a computer;
receiving at least one submission of suspected malware from at least one source, and determining additional information concerning the at least one submission from the receipt, by a computer;
receiving detected malware, by a computer; and
receiving suspected malware, and determining the suspected malware comprises actual malware, by a computer.

3. The method of claim 1 wherein analyzing information concerning malware infections further comprises performing at least one step from a group of steps consisting of:
analyzing information concerning at least one detection of malware, by a computer; and
analyzing information concerning at least one submission of malware, by a computer.

4. The method of claim 1 wherein reaching a suspiciousness level associated with a specific one of the plurality of sources is based on at least one step from a group of steps consisting of:
determining a suspiciousness level associated with a source responsive at least to identifying multiple detections of previously unknown malware on the source, by a computer;
determining a suspiciousness level associated with a source responsive at least to identifying multiple submissions of previously unknown malware by the source, by a computer;
determining a suspiciousness level associated with a source responsive at least to determining that the source comprises an originator of malware, by a computer;
determining a suspiciousness level associated with a source responsive at least to identifying multiple detections, on the source, of malware early in its life cycle, by a computer;
determining a suspiciousness level associated with a source responsive at least to identifying multiple submissions, by the source, of malware early in its life cycle, by a computer;
determining a suspiciousness level associated with a source responsive at least to identifying detections of multiple instances of malware with different hash values but a single signature on the source, by a computer; and
determining a suspiciousness level associated with a source responsive at least to identifying submissions of multiple instances of malware with different hash values but a single signature by the source, by a computer.

5. The method of claim 1 further comprising:
determining a suspiciousness level of each receipt of information concerning a malware infection, by a computer.

6. The method of claim 1 further comprising:
maintaining an ongoing suspiciousness level for each source of the plurality, by a computer.

7. The method of claim 1 wherein at least one source further comprises at least one from a group consisting of:
an individual computer;
a specific user of a specific computer;
a specific user of multiple computers;
a group of computers at a specific domain;
a group of users at a specific domain;
a group of computers at a specific enterprise; and
a group of users at a specific enterprise.

8. The method of claim 1 wherein transmitting submission instructions to the at least one source further comprises:
transmitting submission instructions to the at least one source, by a computer, the submission instructions directing the at least one source to execute the following steps:
subsequent to scanning for malware, identifying all binary files on the at least one source that have not been detected as comprising malware;
submitting those detected binary files to be analyzed;
tracking which binary files have been submitted to be analyzed;
detecting new binary files on the at least one source;
submitting detected new binary files to be analyzed;
detecting modification of binary files on the source; and
submitting detected modified binary files to be analyzed.

9. At least one non-transitory computer readable storage medium storing a computer program product for proactively analyzing binary files from suspicious sources, the computer program product comprising:
program code for receiving information concerning malware infections from a plurality of sources;
program code for analyzing the information concerning the malware infections received in the past from the plurality of sources to determine suspiciousness levels associated with specific ones of the plurality of sources, the suspiciousness levels at least in response to detection of malware on the specific ones of the plurality of sources, by a computer to which the detected malware is previously unknown;
program code for, responsive to a given suspiciousness level associated with at least one source from the plurality of sources reaching a given threshold, transmitting, by a computer, submission instructions directing the at least one source to submit all current binary files to be analyzed, at least a portion of the binary files comprising binary files not associated with detected malware infections;
program code for receiving binary files from the at least one source according to the submission instructions; and
program code for analyzing the binary files not associated with detected malware infections received from the at least one source, to protect the plurality of sources from new malware originating from the at least one source.

10. The computer readable storage medium of claim 9 wherein the program code for receiving information concerning malware infections from a plurality of sources further comprises program code for performing at least one step from a group of steps consisting of:
  receiving information concerning at least one detection of malware on at least one source;
  receiving information concerning at least one detection of malware on at least one source, and determining additional information concerning the at least one detection from the receipt;
  receiving at least one submission of suspected malware from at least one source;
  receiving at least one submission of suspected malware from at least one source, and determining additional information concerning the at least one submission from the receipt;
  receiving detected malware; and
  receiving suspected malware, and determining the suspected malware comprises actual malware.

11. The computer readable storage medium of claim 9 wherein the program code for analyzing information concerning malware infections further comprises program code for performing at least one step from a group of steps consisting of:
  analyzing information concerning at least one detection of malware; and
  analyzing information concerning at least one submission of malware.

12. The computer readable storage medium of claim 9 wherein the program code for determining a suspiciousness level associated with a specific one of the plurality of sources further comprises program code for performing at least one step from a group of steps consisting of:
  determining a suspiciousness level associated with a source responsive at least to identifying detection of malware early in its life cycle on the source;
  determining a suspiciousness level associated with a source responsive at least to identifying submission of malware early in its life cycle by the source;
  determining a suspiciousness level associated with a source responsive at least to identifying multiple detections of previously unknown malware on the source;
  determining a suspiciousness level associated with a source responsive at least to identifying multiple submissions of previously unknown malware by the source;
  determining a suspiciousness level associated with a source responsive at least to determining that the source comprises an originator of malware;
  determining a suspiciousness level associated with a source responsive at least to identifying multiple detections, on the source, of malware early in its life cycle;
  determining a suspiciousness level associated with a source responsive at least to identifying multiple submissions, by the source, of malware early in its life cycle;
  determining a suspiciousness level associated with a source responsive at least to identifying multiple detections of suspicious malware on the single source;
  determining a suspiciousness level associated with a source responsive at least to identifying multiple submissions of suspicious malware by the source;
  determining a suspiciousness level associated with a source responsive at least to a country in which the source is located;
  determining a suspiciousness level associated with a source responsive at least to identifying detections of multiple instances of malware with different hash values but a single signature on the source; and
  determining a suspiciousness level associated with a source responsive at least to identifying submissions of multiple instances of malware with different hash values but a single signature by the source.

13. The computer readable storage medium of claim 9 further comprising:
  program code for determining a suspiciousness level of each receipt of information concerning a malware infection.

14. The computer readable storage medium of claim 9 further comprising:
  program code for maintaining an ongoing suspiciousness level for each source of the plurality.

15. The computer readable storage medium of claim 9 wherein at least one source further comprises at least one from a group consisting of:
  an individual computer;
  a specific user of a specific computer;
  a specific user of multiple computers;
  a group of computers at a specific domain;
  a group of users at a specific domain;
  a group of computers at a specific enterprise; and
  a group of users at a specific enterprise.

16. The computer readable storage medium of claim 9 wherein the program code for transmitting submission instructions to the at least one source further comprises:
  program code for transmitting submission instructions to the at least one source, the submission instructions directing the at least one source to execute the following steps:
    identifying all binary files on the at least one source that have not been detected as comprising malware;
    submitting those detected binary files to be analyzed;
    tracking which binary files have been submitted to be analyzed;
    detecting new binary files on the at least one source;
    submitting detected new binary files to be analyzed;
    detecting modification of binary files on the source; and
    submitting detected modified binary files to be analyzed.

17. A computer implemented method for proactively submitting binary files to be analyzed, the method comprising the steps of:
  sending information concerning detected malware infections from a client computer to a server computer that receives information concerning malware infections from a plurality of sources, by a client computer;
  receiving submission instructions from the server computer, responsive to the client computer reaching a threshold suspiciousness level for malware received in the past, the suspiciousness level at least in response to detection of malware on the client computer previously unknown to the server computer, the submission instructions directing the client computer to submit all current binary files to the server computer to be analyzed, at least a portion of the binary files comprising one of: binary files not associated with the detected malware infections, and binary files created or modified subsequent to receipt of the malware infection information; and
  transmitting binary files to the server computer to be analyzed, by the client computer.

18. The method of claim 17 further comprising:
  identifying all local binary files that have not been detected as comprising malware, by the client computer; and transmitting those detected binary files to the server computer to be analyzed, by the client computer.

19. The method of claim 17 further comprising:

tracking which binary files have been submitted to the server computer to be analyzed, by the client computer;

detecting new local binary files, by the client computer; and transmitting the detected new binary files to the server computer, to be analyzed, by the client computer.

20. The method of claim 17 further comprising:

tracking which binary files have been submitted to the server computer to be analyzed, by the client computer;

detecting modification of local binary files, by the client computer; and submitting the detected modified binary files to the server computer to be analyzed, by the client computer.

21. The method of claim 17 wherein reaching a suspiciousness level associated with a specific one of the plurality of sources is based on at least one step from a group of steps consisting of:

determining a suspiciousness level associated with a source responsive at least to identifying detection of malware early in a life cycle of the detected malware, on the source, by the server computer;

determining a suspiciousness level associated with a source responsive at least to identifying submission of malware early in a life cycle of the detected malware, on the source, by the server computer.

* * * * *